Patented Oct. 6, 1931

1,826,329

UNITED STATES PATENT OFFICE

GERHARD KARL EMIL HEINRICH STAMPE, OF LUBECK, GERMANY, ASSIGNOR, BY MESNE ASSIGNMENTS, TO HEINRICH OTTO DRAGER, OF LUBECK, GERMANY

ABSORBENT FOR BREATHING CARTRIDGES

No Drawing. Application filed January 5, 1928, Serial No. 244,778, and in Germany January 7, 1927.

My invention relates to the manufacture of a composition capable of absorbing carbon dioxide and water vapor and of liberating oxygen and suitable for use in breathing cartridges of respirators. One of the objects of the invention is to produce a material of the aforesaid kind in a simple and inexpensive manner.

It is well known that the peroxides of alkali metals or of alkaline earth metals, such as sodium peroxide or potassium peroxide, are not adapted to absorb the carbonic acid and the aqueous vapors exhaled during the use of breathing cartridges and to generate oxygen quickly enough. Peroxides are in general more quickly decomposed in the presence of water, and it has therefore been proposed to convert the peroxide to hydroxide, which is more quickly reactive toward carbon dioxide, by incorporating a certain amount of water with such peroxides in a variety of ways. Such addition of water to the peroxide during the preparatory treatment, however, always causes a certain amount of peroxide to be decomposed with the liberation of oxygen which is generally lost, while the corresponding hydroxide is produced in accordance with the following equation:

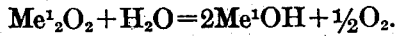

$$Me^1{}_2O_2 + H_2O = 2Me^1OH + \tfrac{1}{2}O_2.$$

In this manner the metal hydroxide is produced from the more expensive peroxide and is incorporated in the peroxide.

In accordance with the present invention, the metal hydroxide, which acts as the carbon dioxide absorbing agent, is not incorporated with the peroxide indirectly by deliverate decomposition of a portion of the rather expensive peroxide, but is added directly to the unchanged peroxide in such a manner or under such conditions that a very intimate and homogeneous mixture is obtained which may be of the order of molecular dispersion. Hydrated hydroxides have heretofore been mixed with peroxides, but the composition of my present invention differs from the known mixture by reason of its freedom from water and of the very intimate or isotropic character of the mixture, the mixture produced according to the present invention assuming what may be the form of a solution or that of a molecular association (i. e. a double or possibly a complex compound). Experiments have proved that this new composition is essentially superior to the known mixtures inasmuch as it develops oxygen more evenly and quickly during breathing, the reason for which is the fact that the components, for instance, NaOH and $Na_2O_2$ are very intimately or even molecularly beside one another in the same particle.

The extremely intimate mixture aimed at according to the present invention may be secured, for instance, by melting the components together, the cooling thereupon being preferably carried out in such manner that no separation of one compound from the other takes place. This may be accomplished by vigorously agitating the molten mass as it is cooled. A very intimate mixture of the components thus takes place. A very intimate mixture may also be secured by precipitating the components out of a common solvent and also by sintering together the finely powdered components. In each case the complete absence of water should be provided for, for example, by starting out with substantially water-free materials, by employing a non-aqueous solvent where a solvent is used, and by operating in a dry atmosphere. The simultaneous precipitation of the components may, for example, be effected by dissolving them in ice-cooled absolute alcohol and then either evaporating the larger part of the solvent or precipitating the solute with anhydrous acetone. The precipitate obtained in either of these ways may then be dried in an ice-cooled suction filter, the operations preferably taking place in a nitrogen atmosphere. In these several ways what may be called a molecular dispersion of one compound in the other is produced. Satisfactory admixture of the components may also be secured by grinding them together for a long time until a fine powder is produced in which practically complete and uniform dispersion of the minute particles of one compound in those of the other is secured. Preferably the composition contains about 50–80% peroxide.

As already indicated the components are employed in completely anhydrous condition. The melting of the components may take place at ordinary atmospheric pressure in an atmosphere of dry air, the heating being continued until the fusion temperature is just reached. This temperature lies between 500 and 800° C. depending upon the desired composition of the product.

The term "alkaline groups" as used in the claims is to be understood to include both the alkali group (e. g. sodium and potassium) and the alkali earth group (e. g. barium); while by the term "reactive water" is meant water in a form (e. g. free water or water contained in crystals) in which it is capable of attacking and decomposing an alkali peroxide.

I claim:

1. A breathing cartridge material devoid of reactive water and capable of absorbing carbon dioxide and aqueous vapors while simultaneously liberating oxygen, comprising an anhydrous peroxide of a metal of the alkaline groups and a hydroxide of a metal of such groups in homogeneous, intimate admixture.

2. A breathing cartridge material devoid of reactive water and capable of absorbing carbon dioxide and aqueous vapors while simultaneously liberating oxygen, comprising anhydrous sodium peroxide and a hydroxide of a metal of the alkaline groups in homogeneous, intimate admixture.

3. A breathing cartridge material devoid of reactive water and capable of absorbing carbon-dioxide and aqueous vapors while simultaneously liberating oxygen, comprising anhydrous sodium peroxide and sodium hydroxide in homogeneous, intimate admixture.

In testimony whereof I have signed my name to this specification.

GERHARD KARL EMIL HEINRICH STAMPE.